United States Patent [19]

Damiano et al.

[11] Patent Number: 4,638,226
[45] Date of Patent: Jan. 20, 1987

[54] SPEED CONTROL SYSTEM WITH FEEDBACK AND SOFT-START

[75] Inventors: Michael A. Damiano, Germantown; Richard F. Schmerda, Oak Creek; Lawrence G. Searing, Milwaukee, all of Wis.

[73] Assignee: Eaton Corporation, Cleveland, Ohio

[21] Appl. No.: 699,522

[22] Filed: Feb. 7, 1985

[51] Int. Cl.[4] .............................................. H02P 5/16
[52] U.S. Cl. ........................... 318/345 R; 318/345 D; 318/331; 318/332; 318/345 H; 363/123
[58] Field of Search ........... 318/345 R, 345 A, 345 C, 318/345 CA, 345 CB, 345 AB, 345 B, 345 D, 345 E, 345 F, 345 G, 345 H, 331, 332, 333, 244, 248, 245, 257, 385, 387, 391, 392, 400, 411, 416

[56] References Cited

U.S. PATENT DOCUMENTS

| | | | |
|---|---|---|---|
| 3,177,418 | 4/1965 | Meng | 318/345 CA X |
| 3,231,809 | 1/1966 | Greer | 318/400 |
| 3,346,874 | 10/1967 | Howell | 307/597 X |
| 3,358,205 | 12/1967 | Wechsler | 318/345 G X |
| 3,366,861 | 1/1968 | Dudler | 318/341 X |
| 3,373,331 | 3/1968 | Dow | 318/345 CA X |
| 3,402,338 | 9/1968 | Thoresen | 318/310 |
| 3,450,974 | 6/1969 | Berlin | 318/331 |
| 3,452,264 | 6/1969 | Turtle | 318/341 X |
| 3,474,319 | 10/1969 | Berlin | 318/331 |
| 3,475,677 | 10/1969 | Swinehart et al. | 318/245 H X |
| 3,495,154 | 2/1970 | Dosch et al. | 318/341 X |
| 3,532,951 | 10/1970 | Hovance | 318/331 |
| 3,564,372 | 2/1971 | Vogelsberg et al. | 318/345 H |
| 3,573,580 | 4/1971 | Shinozaki | 318/416 X |
| 3,585,476 | 6/1971 | Rutchik | 318/331 |
| 3,586,947 | 6/1971 | Ilk | 318/331 |
| 3,588,647 | 6/1971 | Harwell | 318/345 D X |
| 3,596,158 | 7/1971 | Watrous | 318/227 |
| 3,634,874 | 1/1972 | Mason | 318/345 H |
| 3,678,360 | 7/1972 | Minarik et al. | 318/332 |
| 3,742,337 | 6/1973 | Digneffe | 318/345 D X |
| 3,761,789 | 9/1973 | Kraft et al. | 318/331 |
| 3,775,576 | 11/1973 | Brown | 200/157 |
| 3,848,168 | 11/1974 | Hornung | 318/331 |
| 3,875,485 | 4/1975 | Hornung | 318/227 |
| 3,935,505 | 1/1976 | Spiteri | 338/220 X |
| 3,962,616 | 6/1976 | Smith | 318/400 |
| 4,095,072 | 6/1978 | Piber | 318/345 R X |
| 4,168,455 | 9/1979 | Soeda et al. | 318/317 X |
| 4,232,258 | 11/1980 | Matsumura | 318/345 H |
| 4,333,045 | 6/1982 | Oltendorf | 318/416 X |

FOREIGN PATENT DOCUMENTS

| | | | |
|---|---|---|---|
| 1809960 | 5/1970 | Fed. Rep. of Germany | 318/345 |
| 2238093 | 2/1974 | Fed. Rep. of Germany | 318/345 H |
| 6607861 | 12/1967 | Netherlands | 318/345 |

OTHER PUBLICATIONS

G. E. Controlled Rectifier Manual, First Edition, Mar. 20, 1960.
Economy Power Semiconductor Applications by F. W. Gutzwiller and E. K. Howell G.E. p. 16.

Primary Examiner—William M. Shoop, Jr.
Assistant Examiner—Shik Luen Paul Ip
Attorney, Agent, or Firm—D. A. Rowe; L. G. Vande Zande

[57] ABSTRACT

A motor (M) supplied by AC full-wave voltage is controlled by a triac (Q2) under the control of a double-time constant triggering circuit which has a speed setting branch (R3-C2) connected at the triac (Q2) side of the motor (M) and the other time constant branch (R1-C1) connected at the supply side of the motor (M) to provide a feedback function as well as a first time constant. A unidirectional diode (D1) is incorporated in the feedback sensing time constant branch for rendering feedback signals only on alternate half cycles to prevent oscillation and overcompensation of motor speed due to the feedback signal. A soft-start circuit, usable also in half-wave applications, is incorporated in the branch containing adjustable speed setting resistor and comprises a transistor (Q3) having its collector-emitter circuit connected in series with the adjustable resistor (R3). A resistor (R4)-capacitor(C3) time constant circuit is provided to supply time variable current to the base of the transistor (Q3) through a resistor (R5) for causing the transistor (Q3) to gradually conduct, thereby gradually decreasing its resistance and therefore gradually increasing the firing angle of the triac (Q2).

5 Claims, 3 Drawing Figures

SPEED CONTROL SYSTEM WITH FEEDBACK AND SOFT-START

BACKGROUND OF THE INVENTION

This invention relates to controls for electric motors and is particularly useful for controlling universal motors of hand held portable electric tools.

Controls of the aforementioned type are commonly incorporated within a self contained switch structure such as that shown in U.S. Pat. No. 3,775,576 issued Nov. 27, 1973 to Harry W. Brown. Switches of this type are housed in the handle of the portable electric tool and have a depressable operator which is controlled by the index finger of the hand holding the tool. Depression of the operator actuates a switch for connecting the motor to a source of electric power and increases the speed of the motor as a function of the amount of depression of the operator. It is frequently desirable that the tool be capable of starting from an OFF condition without the motor causing a torquing or jerking of the tool in the hand of the user. It is further desirable that the speed of the motor be maintained at the selected level when the tool is subjected to a loading condition.

The aforementioned desirable qualities are accomplished by providing soft-start and feedback circuits in the control. However, in consideration of cost and compact packaging of such controls, particular attention need be given to the number, size and cost of the components of the control system. Half-wave controls have been predominantly used, particularly where feedback is incorporated, because the number of components may be significantly reduced. However, half-wave controls limit the speed range of the motor to approximately 85% of full speed. Full-wave controls provide a greater range of motor speed control, but generally require several large power handling components which increase cost and package size of the switch housing the control and create heat dissipation problems for the components. Present speed controls which incorporate soft-start and feedback features utilize sensing resistors, uni-junction transistors, pulse transformers, and thermistors. These components are generally power handling components which are relatively high in cost, physically large, consume significant space, and increase the complexity of the control and its assembly operation. Moreover, significant power is dissipated by these components that must be removed from the control and that is not available to the motor being controlled.

SUMMARY OF THE INVENTION

This invention provides a motor control system for providing full-wave speed control over a speed range of approximately 50% to 100% of motor shaft output speed and for providing feedback and soft-start features. A double-time constant triggering circuit is utilized to control the conduction angle of a motor controlling thyristor. The double-time constant circuit is uniquely connected to have its separate time constant branches connected respectively on opposite sides of the motor. By so doing, one branch of the double-time constant circuit senses motor counter emf on alternate half cycles of the control to provide feedback for the control system. The other branch of the double-time constant circuit, connected to an opposite side of the motor, provides the speed setting function by means of an adjustable resistor. A soft-start feature is incorporated in the speed setting branch by a time variable resistance circuit in series with the adjustable resistor. The time variable resistance circuit is in the gate control, or triggering, circuit for the thyristor and therefore the components require ratings only adequate to carry gate trigger current for the thyristor.

DESCRIPTION OF THE PREFERRED EMBODIMENT

Figure 1:
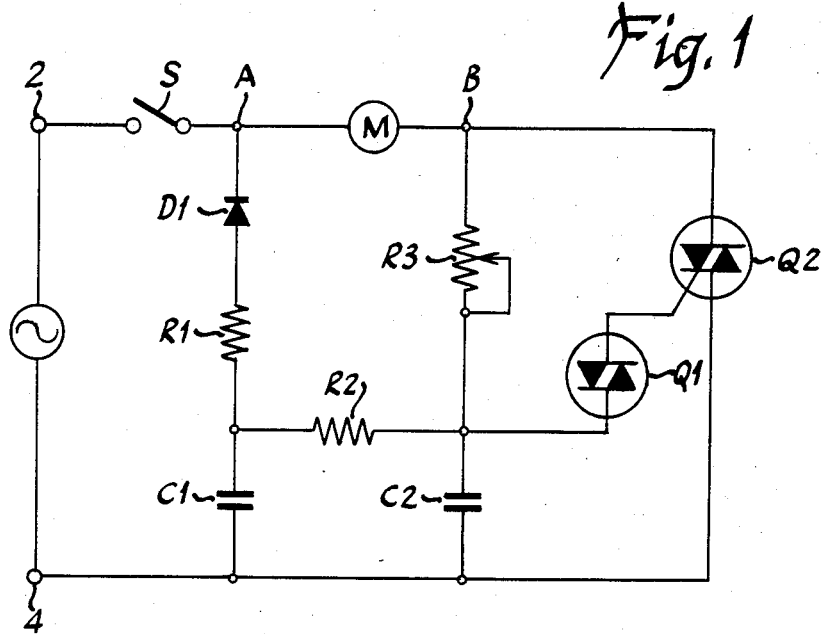
FIG. 1 is a schematic diagram of the full-wave speed control system of this invention having feedback.

Referring to the drawings wherein like components have been given the same reference character throughout the several figures, FIG. 1 shows a full-wave speed control system having feedback constructed in accordance with this invention. A motor M is connected to terminals 2 and 4 in series with the main electrodes of a bidirectional conducting thyristor or triac Q2. The terminals 2 and 4 are adapted to be connected to a source of AC power. A manually operated switch is connected in a conductor between terminal 2 and motor M for selectively connecting the control circuit to the source of AC power. A double-time constant triggering circuit is provided for controlling the conduction angle of the triac. Series connected resistor R1 and capacitor C1 are connected across the AC supply terminals 2 and 4 at the supply side of the motor M to provide a first time constant. A second time constant is provided by adjustable resistor R3 series connected with capacitor C2 across the AC supply at the opposite or triac side of the motor M. A trimming resistor R2 is connected between the junction of resistor R1 and capacitor C1 and the junction of resistor R3 and capacitor C2. The latter junction is connected to a gate electrode of triac Q2 through a bilateral diac or silicon bilateral switch Q1. Diac Q1 aids the triggering process by providing a distinct voltage threshold for triggering the triac Q2. Resistor R3 and capacitor C2 form the speed setting control for the system. The value of capacitor C2 is selected such that when it charges to the threshold value of diac Q1 it will have sufficient current to fire triac Q2 hard enough to maintain that component conducting. The time constant provided by the circuit branch containing resistor R1 and capacitor C1 has the AC line voltage applied thereto and capacitor C1 charges up to substantially a fixed value which is greater than the charge on capacitor C2. Trimming resistor R2 allows capacitor C1 to discharge therethrough and provide a small trickle current into capacitor C2 to prevent it from discharging completely down to a zero level after it has fired the triac Q2.

As mentioned previously, the branch of the double-time constant circuit containing resistor R1 and capacitor C1 is connected on the supply side of the motor M while the speed setting branch comprising resistor R3 and capacitor C2 is connected on the opposite or triac side of motor M. With this arrangement, the branch containing resistor R1 and capacitor C1 serve to provide feedback to the triggering circuit by sensing the loading on motor M. The voltage at point A is effectively the supply voltage while the voltage at point B is reduced by any voltage drop appearing across the motor M. Counter emf provided by the motor tends to equalize the voltages at point A and B, but as the motor is loaded, the voltage at point B becomes smaller with respect to the voltage at point A due to a decrease in counter emf. Accordingly, as the motor becomes more heavily loaded, capacitor C1 charges to an increasingly greater value than capacitor C2 and a larger current flow exists in the branch containing the resistor R2 into capacitor C2 to charge it to a higher voltage and current level. To prevent oscillation and overcompensation of motor speed by the application of a feedback signal on both half cycles of the full-wave supply, a diode D1 is inserted into the feedback sensing branch in series with resistor R1 such that it blocks current flow in that branch when the voltage at terminal 2 is positive with respect to the voltage at terminal 4. Thus a feedback signal is applied to the triggering circuit only on alternate half cycles which tends to stabilize the motor speed as it increases due to the feedback signal. The control system of FIG. 1 provides a desirable double-time constant triggering circuit control for motor M and also provides a preferred half-wave feedback signal for the motor through the addition of only a single diode and by the particular manner in which the double-time constant triggering circuit is connected around the motor.

Figure 2:
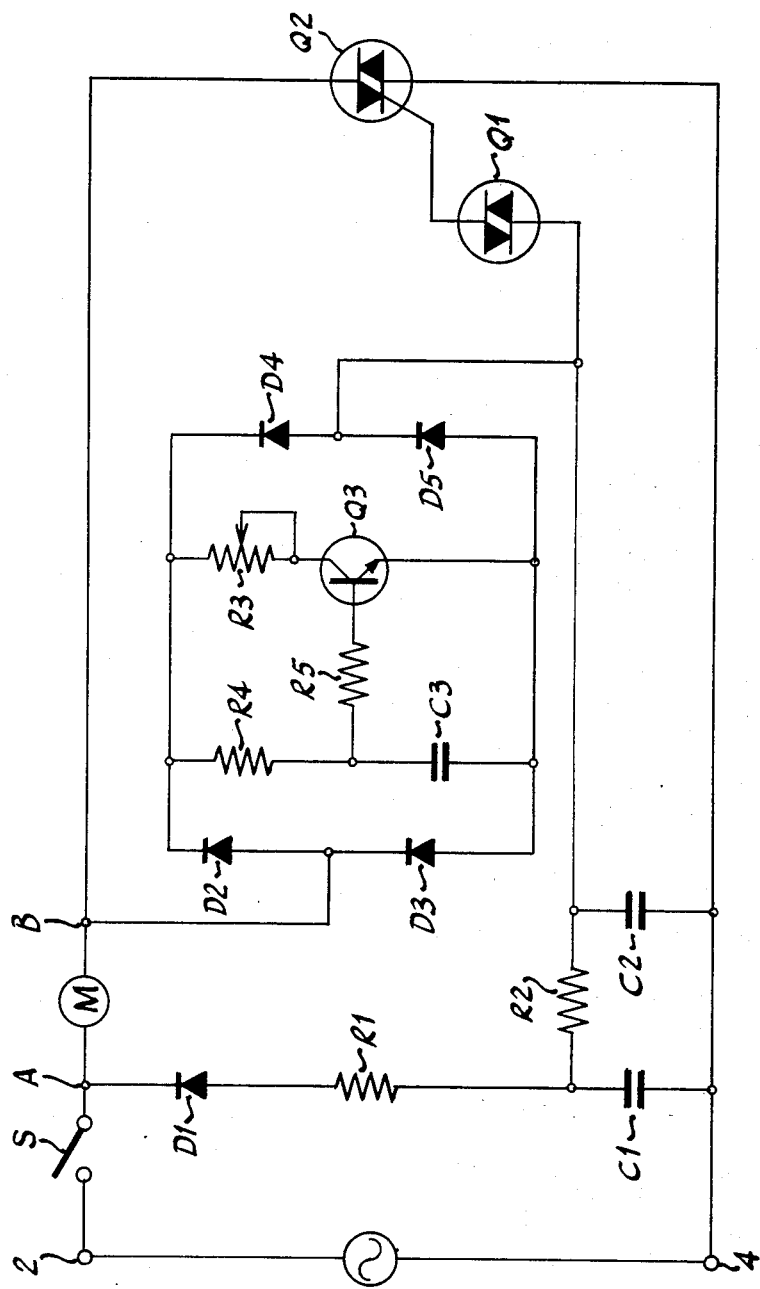
FIG. 2 is a schematic diagram of the full-wave speed control system of this invention having both feedback and soft-start features.

FIG. 2 shows the full-wave speed control circuit having feedback of FIG. 1, and further incorporates a soft-start circuit therein. To this end, the branch of the double-time constant triggering circuit containing adjustable resistor R3 is provided with a full-wave rectifier bridge comprising diodes D2–D5 having its AC terminals connected between the junction of motor M with a main electrode of triac Q2 and the junction of capacitor C2 with diac Q1 in the gate control circuit for triac Q2. A time variable resistance circuit is connected across the rectified terminals of the full-wave rectifier bridge and has the adjustable resistor R3 connected in its output circuit. A transistor Q3 is utilized as a time variable resistance device and has its collector-emitter circuit connected in series with resistor R3 adjacent the negative rectified terminal of the rectifier bridge. A time constant circuit comprising series connected resistor R4 and capacitor C3 is also connected across the rectified terminals of the rectifier bridge in parallel with adjustable resistor R3 and collector-emitter circuit of transistor Q3. A point common between resistor R4 and capacitor C3 is connected to the base of transistor Q3 through a resistor R5. When the circuit of FIG. 2 is initially connected to the AC source by closure of switch S, transistor Q3 is nonconducting and acts as an infinitely large resistance. Accordingly, no charging signal is sent to capacitor C2 and the triac Q2 is nonconductive. As power is applied to the circuit, capacitor C3 charges through resistor R4 to a desired voltage which impresses a small base-emitter current to transistor Q3 through resistor R5, thereby turning transistor Q3 on a small amount. Transistor Q3 is utilized as an amplifying device and it provides a small charging current to capacitor C2 which then charges to a voltage sufficient to turn triac Q2 on at a point late in the first half cycle of applied voltage. Inasmuch as there is no discharge path for capacitor C2 except through resistor R5 and the base-emitter circuit of transistor Q3, some residual charge remains on capacitor C3 at the beginning of the next half cycle. Capacitor C3 therefore charges up to an incrementally higher voltage each half cycle and therefore supplies a higher current value to transistor Q3 each half cycle so that the conduction of Q3 gradually increases and its resistance gradually decreases over successive half cycles of applied power. As the resistance decreases, capacitor C2 charges to higher values and the triac Q2 is rendered conducting for a greater portion of each half cycle, thereby increasing the speed of motor M. Transistor Q3 becomes fully conducting as a function of time determined by the values selected for R4-C3 and then provides very little resistance whereby adjustable resistor R3 functions to provide the significant resistance in the circuit and operates in its speed setting function. Inasmuch as the soft-start control circuit is embodied in the gate control circuit for the triac Q2, the components thereof are not required to have high current ratings but they must have reverse voltage ratings greater than the peak of the AC input line voltage. Variable resistor R3 is located in the output circuit of transistor Q3 so that the soft-start time delay is relatively independent of the speed selected. The soft-start is primarily controlled by the RC time constant of resistor R4 and capacitor C3. The value of R4 must be low enough to cause transistor Q3 to provide full gate current to the triac Q2 after the soft-start time delay has expired. The soft-start circuit reduces the maximum voltage to motor M slightly, but in practice it has been found that the motor M reaches approximately 95% of full speed.

Figure 3:
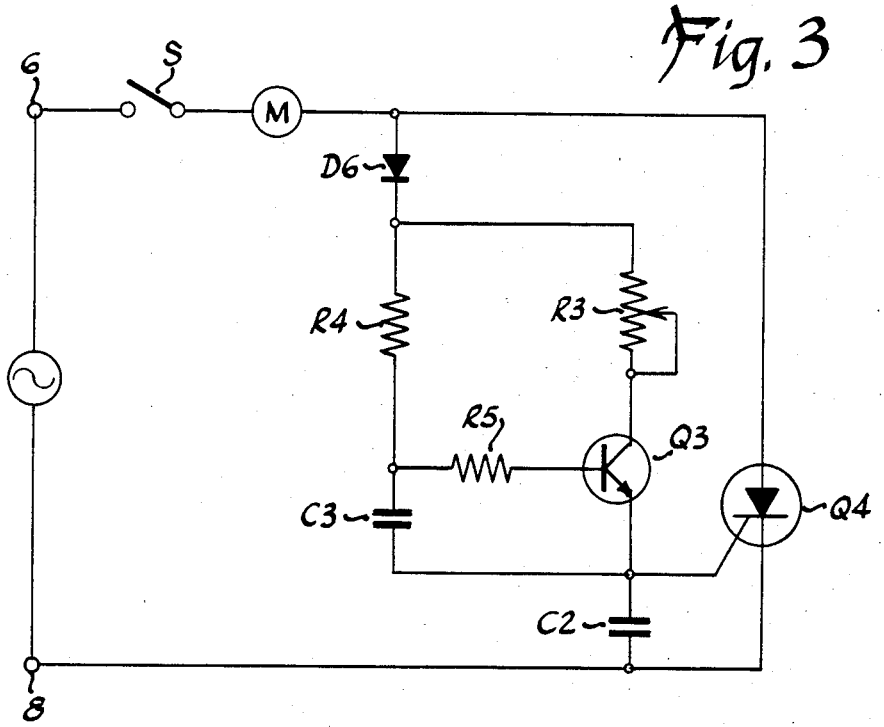
FIG. 3 is a schematic diagram of a half-wave control system incorporating the soft-start feature of this invention.

FIG. 3 shows an application of the soft-start circuit to a half-wave motor control circuit being controlled by another form of thyristor. In this figure, terminals 6 and 8 are adapted for connection to an AC supply whereby during one half cycle terminal 6 would be positive with respect to terminal 8. The manual switch S is provided in the line from terminal 6 to motor M to selectively connect or disconnect the circuit to the power supply. A silicon controlled rectifier (SCR) Q4 has its anode-cathode connected in series with motor M across terminals 6 and 8. A speed setting circuit comprising adjustable resistor R3 and capacitor C2 is connected across the anode-cathode circuit of SCR Q4 and the positive side of capacitor C2 is connected to the gate of SCR Q4 for controlling the conduction angle of SCR Q4 and therefore the speed of motor M. As described in connection with FIG. 2, the soft-start circuit is incorporated in the speed setting branch of the triggering circuit by connecting the collector-emitter circuit of transistor Q3 in series with adjustable resistor R3 and capacitor C2. The time constant circuit R4-C3 for the soft-start circuit is connected directly from the positive supply side to the emitter of transistor Q3; the point common between resistor R4 and capacitor C3 is connected to the base of transistor Q3 through resistor R5. Inasmuch as the circuit of FIG. 3 is a half-wave circuit having half-wave rectification provided by diode D6, it is not necessary to employ the full-wave rectifier bridge provided in FIG. 2. Diode D6 prevents large negative voltages from being applied to the base-emitter junction of transistor Q3. In all other respects the soft-start circuit of FIG. 3 operates as described in conjunction with the circuit of FIG. 2. While the transistor Q3 is a current operated device and therefore requires the resistor R5 in the base of control circuit thereof, it is to be understood that a voltage dependent device such as a FET could be substituted for the transistor Q3 in which case the resistor R5 would not be required.

Thus, it will be appreciated from the foregoing that we have provided a speed control system for a universal motor which provides full-wave speed control and incorporates half-wave feedback and soft-start features in a simple manner without addition of a large number of high rated components. The soft-start feature incorporates the speed setting adjustable resistor in the output circuit of an amplifying transistor which functions as a time variable resistance, thereby to provide a soft-start regardless of motor speed setting. Although the circuit has been shown in preferred embodiments, it is to be understood that it is susceptible of various modifications without departing from the scope of the appended claims.

We claim:

1. An adjustable speed control system for a universal motor connected in a supply circuit for providing full-wave AC power to said motor comprising, in combination:
    a bidirectional conducting thyristor having a pair of main electrodes connected in series circuit relation with said motor in said supply circuit and having a gate electrode; and
    a double-time constant triggering circuit connected across said supply circuit in parallel circuit relation with said thyristor and connected to said gate electrode for controlling the conduction angle of said thyristor, said triggering circuit comprising;
    a first time constant circuit comprising a first resistor and capacitor and a unidirectional diode connected in series across said supply circuit at one side of said motor for sensing counter emf in said motor and providing a feedback signal in said triggering circuit only on alternate half cycles of said full-wave AC power;
    a second time constant circuit comprising an adjustable resistor and a second capacitor connected in series across said supply circuit at an opposite side of said motor for setting the speed of said motor;
    a third resistor connecting the junction of said first resistor and capacitor to the junction of said adjustable resistor and second capacitor across said motor; and
    means connecting said last mentioned junction to said gate electrode.

2. The invention defined in claim 1 wherein said first time constant circuit comprises a unidirectional diode for rendering said first time constant circuit sensitive to said motor counter emf only on alternate half cycles of said full-wave AC power.

3. The invention defined in claim 1 wherein said time variable resistance means comprises a solid state switching device having main electrodes connected between said rectified terminals in series with said adjustable resistor, a resistor-capacitor circuit connected between said rectified terminals in parallel circuit relation with said switching device main electrodes, and means connecting a junction of the resistor and capacitor of said resistor-capacitor circuit to a control electrode of said switching device.

4. The invention defined in claim 3 wherein said adjustable resistor is connected between a positive rectified terminal of said rectifier bridge and said switching device main electrodes.

5. The invention defined in claim 4 wherein said means connecting a junction of the resistor and capacitor of said resistor-capacitor circuit to a control electrode of said switching device comprises a resistor.

* * * * *